(12) United States Patent
Frank

(10) Patent No.: US 10,673,510 B2
(45) Date of Patent: Jun. 2, 2020

(54) METHOD AND APPARATUS FOR TRANSMITTING AN OUTPUT STREAM OF SYMBOLS OVER AN ANTENNA PORT

(71) Applicant: Motorola Mobility LLC, Chicago, IL (US)

(72) Inventor: Colin Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/608,831

(22) Filed: May 30, 2017

(65) Prior Publication Data

US 2018/0351626 A1 Dec. 6, 2018

(51) Int. Cl.
*H04B 7/06* (2006.01)
*H04L 1/06* (2006.01)
*H04L 27/26* (2006.01)

(52) U.S. Cl.
CPC ........... *H04B 7/0669* (2013.01); *H04B 7/068* (2013.01); *H04B 7/0617* (2013.01); *H04B 7/0689* (2013.01); *H04B 7/0695* (2013.01); *H04L 1/0606* (2013.01); *H04L 1/0618* (2013.01); *H04L 1/0668* (2013.01); *H04L 27/2626* (2013.01); *H04L 27/2627* (2013.01); *H04L 1/0625* (2013.01); *H04L 27/2601* (2013.01)

(58) Field of Classification Search
CPC ............... H04L 27/2626; H04L 1/0625; H04L 27/2627; H04L 27/2601; H04B 7/0669
See application file for complete search history.

(56) References Cited

U.S. PATENT DOCUMENTS

| | | | | |
|---|---|---|---|---|
| 6,044,086 A | * | 3/2000 | Albrow | H04J 3/12 370/336 |
| 6,731,668 B2 | * | 5/2004 | Ketchum | H04J 13/0048 370/209 |
| 7,609,771 B2 | * | 10/2009 | Lo | H04B 7/0615 375/259 |
| 7,844,010 B2 | * | 11/2010 | Ylitalo | H04B 7/0634 375/267 |
| 9,826,504 B2 | * | 11/2017 | Callard | H04W 72/005 |
| 2003/0112880 A1 | * | 6/2003 | Walton | H04B 7/0417 375/260 |
| 2005/0048933 A1 | | 3/2005 | Wu | |

(Continued)

OTHER PUBLICATIONS

Panahandeh, PCT International Search Report, International Application No. PCT/US2018/034789, European Patent Office, Rijswijk, NL, dated Aug. 8, 2018.

*Primary Examiner* — Jean B Corrielus
(74) *Attorney, Agent, or Firm* — Loppnow & Chapa; Matthew C. Loppnow

(57) ABSTRACT

A method and apparatus transmit an output stream of symbols over an antenna port. Data can be encoded to generate encoded data at a transmitter at a base station. At least two streams of modulated symbols can be generated at the base station from the encoded data. Each of the at least two streams of modulated symbols can correspond to an antenna port of a plurality of antenna ports at the base station. A non-empty subset of the at least two streams of the modulated symbols can be selected at the base station. The selected subset of the at least two streams of symbols can be transmitted from the base station over an antenna port implemented by applying a weighting to a plurality of antennas.

20 Claims, 9 Drawing Sheets

(56) References Cited

U.S. PATENT DOCUMENTS

| | | | |
|---|---|---|---|
| 2005/0208975 A1* | 9/2005 | Lau | H04B 7/0617 455/562.1 |
| 2005/0254589 A1* | 11/2005 | Higuchi | H04L 25/0234 375/260 |
| 2005/0286462 A1 | 12/2005 | Roh | |
| 2006/0093065 A1* | 5/2006 | Thomas | H04B 7/0426 375/299 |
| 2006/0176993 A1* | 8/2006 | Kwun | H04B 7/0417 375/367 |
| 2007/0171811 A1* | 7/2007 | Lee | H04B 7/061 370/208 |
| 2008/0144738 A1* | 6/2008 | Naguib | H04B 7/0617 375/299 |
| 2010/0074357 A1* | 3/2010 | Ko | H04B 7/12 375/267 |
| 2010/0322337 A1 | 12/2010 | Ylitalo | |
| 2011/0170496 A1* | 7/2011 | Fong | H04L 5/0053 370/329 |
| 2011/0299623 A1 | 12/2011 | Wang | |
| 2013/0044029 A1* | 2/2013 | Yang | H04B 7/0617 342/373 |
| 2014/0185458 A1* | 7/2014 | Yoo | H04W 24/08 370/242 |
| 2015/0085766 A1* | 3/2015 | Kim | H04L 5/0041 370/329 |
| 2016/0261318 A1* | 9/2016 | Ko | H04B 7/0417 |
| 2017/0163317 A1* | 6/2017 | Kim | H04B 7/0408 |

\* cited by examiner

METHOD AND APPARATUS FOR TRANSMITTING AN OUTPUT STREAM OF SYMBOLS OVER AN ANTENNA PORT

BACKGROUND

1. Field

The present disclosure is directed to a method and apparatus for transmitting an output stream of symbols over an antenna port.

2. Introduction

Presently, wireless communication devices communicate with other communication devices using wireless signals. In both the Long Term Evolution (LTE) and High Speed Packet Access (HSPA) specifications, there is support for Multimedia Broadcast Multicast Service (MBMS), which is also known as Enhanced-MBMS. MBMS is used to transmit multicast data, which is data intended for multiple users. Examples of multicast data transmission can include the broadcast transmission of television and emergency information. Another example of multicast data transmission includes the transmission of software updates to User Equipment (UE), such as phones, tablets, laptops, or other devices served by a wireless network. Often, the region served by the MBMS service is much larger than the area covered by a cell of a base station of a network and the MBMS service most typically spans the region covered by multiple cells. As a result, in order to serve this region most efficiently, multiple cells/sectors transmit the same data simultaneously using the same time/frequency resources. Thus, if any intended UE is within range of any of the cells, it will be able to receive the multicast data. This multicast transmission is considered efficient in the sense that many users are served by the same transmission.

Currently, only a single transmission mode is used for MBMS data, which is known as transmission mode 1. With this transmission mode, the data is transmitted from each cell/sector using a single antenna port. Both the data and the reference symbols are transmitted using this same virtual port. With this transmission method, the channel seen by the UE is the sum of the channels that exist between each transmitting base station, such as an enhanced NodeB (eNB), which can also be known as a gNB, and the UE. A problem exists with this method in that the channels may add in-phase, in which case the strength of the received signal is enhanced, or the signals may add out-of-phase, in which case the signals of each channel may cancel out even if they are very strong.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for transmitting an output stream of symbols over an antenna port. According to a possible embodiment, data can be encoded to generate encoded data at a transmitter at a base station. At least two streams of modulated symbols can be generated at the base station from the encoded data. Each of the at least two streams of modulated symbols can correspond to an antenna port of a plurality of antenna ports at the base station. A non-empty subset of the at least two streams of the modulated symbols can be selected at the base station. The selected subset of the at least two streams of symbols can be transmitted from the base station over an antenna port implemented by applying a weighting to a plurality of antennas.

Figure 1:
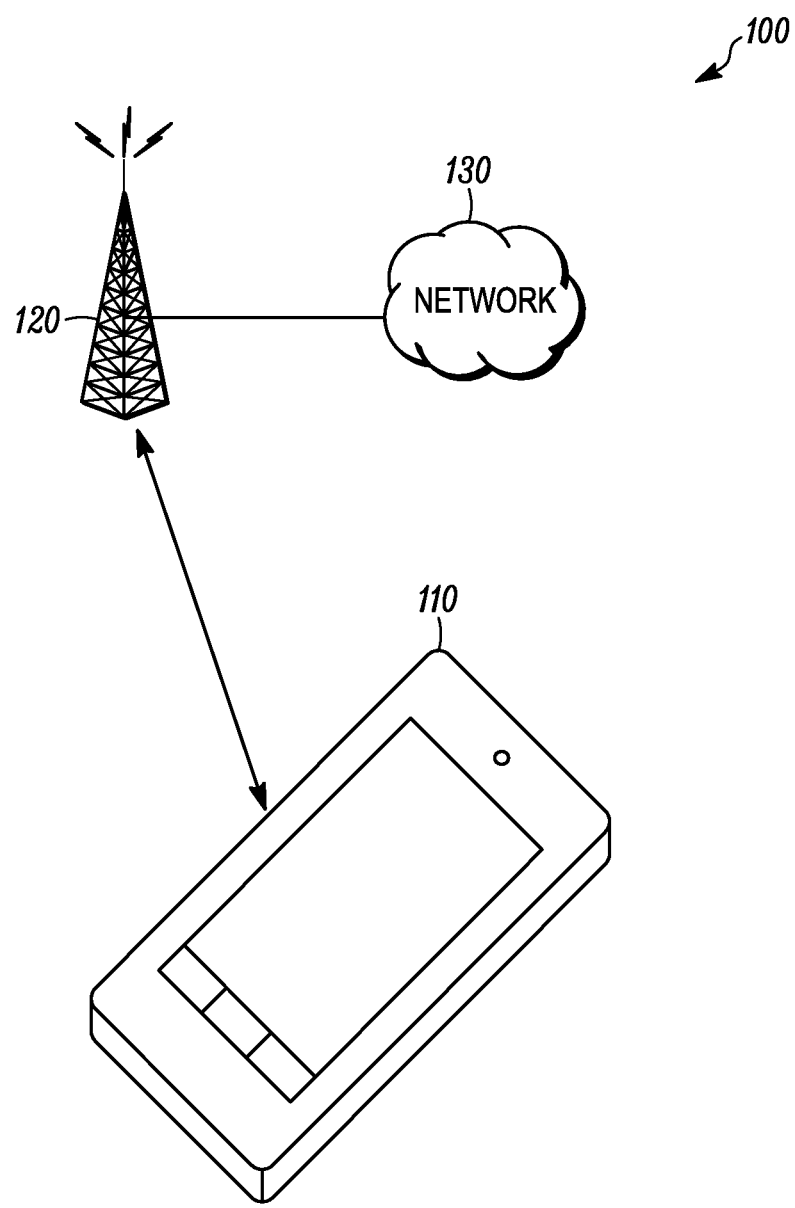
FIG. 1 is an example block diagram of a system according to a possible embodiment.

FIG. 1 is an example block diagram of a system 100 according to a possible embodiment. The system 100 can include a User Equipment (UE) 110, at least one base station 120, and a network 130. The UE 110 can be a wireless wide area network device, a user device, wireless terminal, a portable wireless communication device, a smailphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The base station 120 can be a wireless wide area network base station, a NodeB, an enhanced NodeB (eNB), a 5G or New Radio NodeB (gNB), an unlicensed network base station, an access point, or any other base station that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

Figure 2:
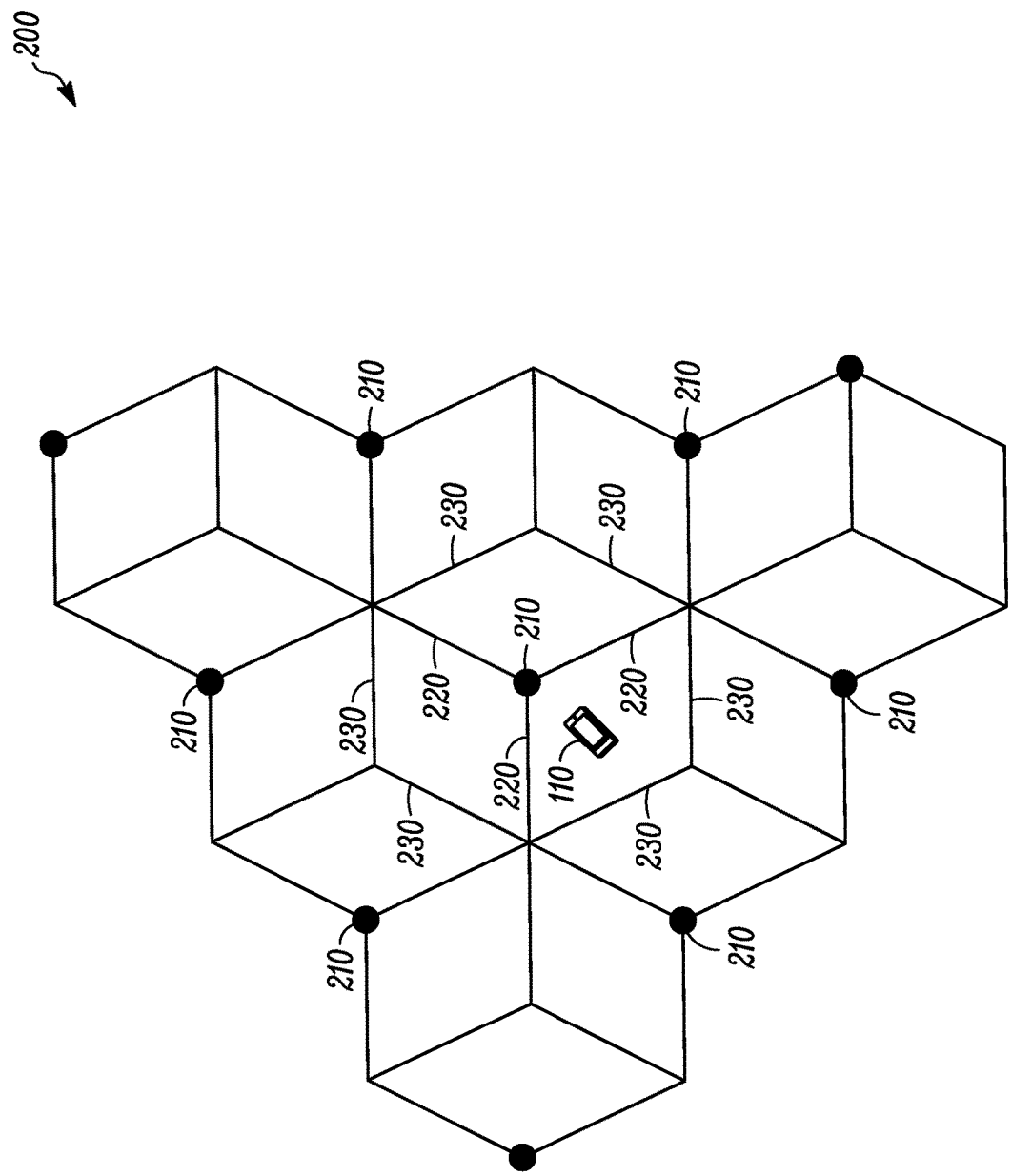
FIG. 2 is an example illustration of a cellular system showing boundaries between cells and sectors according to a possible embodiment.

FIG. 2 is an example illustration of a cellular system 200, such as the system 100, showing boundaries between cells and sectors according to a possible embodiment. The system 200 includes cell locations 210, such as locations of base stations 120, boundaries between sectors of the same cell 220, and boundaries between sectors of different cells 230. At the boundary between sectors of the same cell 220, the signal received at the UE 110 when each eNB, such as each eNB at each cell location 210, is transmitting individually can be very strong. However, when both eNB's transmit the same signal at the same time, the two signals can add out-of-phase and cancel out, even though individually each signal is very strong. For line of sight transmission, this can be viewed as a null in the combined antenna pattern of the cells due to the fact that the antenna patterns may add in-phase or out-of-phase. At boundaries between sectors of different cells 230, the signal strength is typically much weaker than elsewhere. Again, as in the case of adjacent sectors, the signals at this boundary 230 can cancel if they equal in amplitude, but opposite in phase. In order to have more robust performance according to a possible embodiment, the signals at the cell boundaries 230 can add in power so that they do not cancel regardless of their relative phase.

Figure 3:
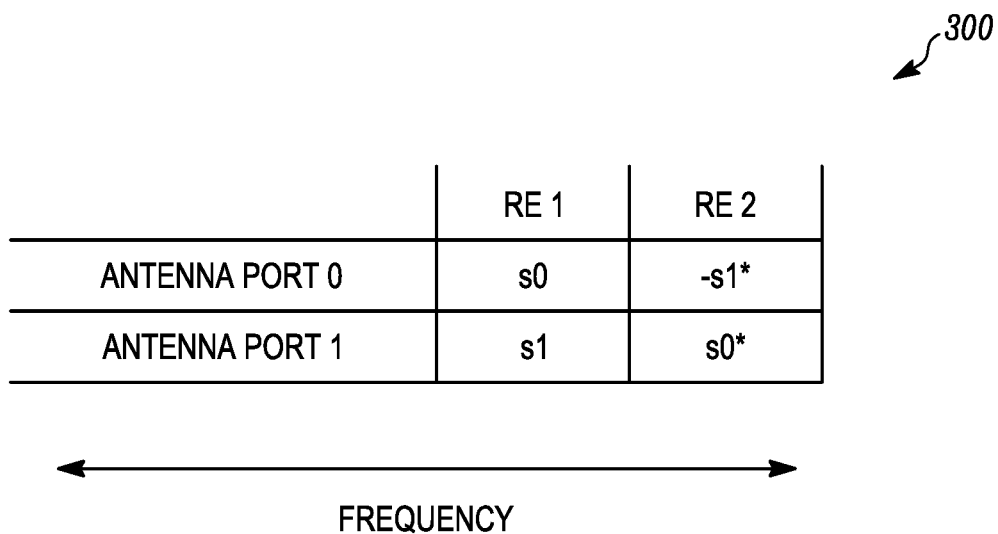
FIG. 3 is an example illustration of Space-Frequency Block Coding (SFBC) mapping of symbols to antenna ports according to a possible embodiment.
Figure 4:
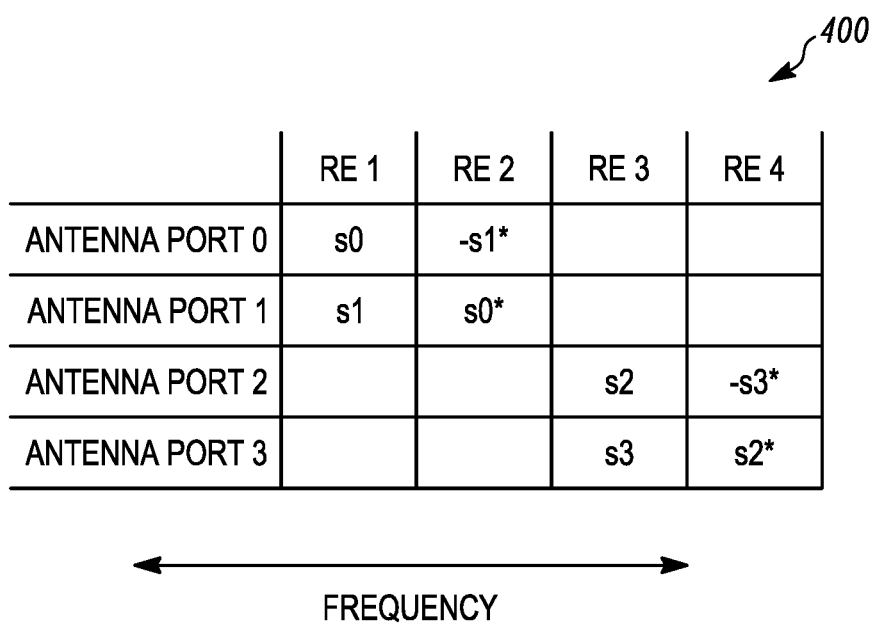
FIG. 4 is an example illustration of SFBC+Frequency-Shift Transmit Diversity (FSTD) mapping of symbols to antenna ports according to a possible embodiment.

FIG. 3 is an example illustration 300 of Space-Frequency Block Coding (SFBC) mapping of symbols to antenna ports according to a possible embodiment. FIG. 4 is an example illustration 400 of SFBC+Frequency-Shift Transmit Diversity (FSTD) mapping of symbols to antenna ports according to a possible embodiment. In these illustrations 300 and 400, s can denote symbols and RE can denote resource elements. Also, s* can denote a conjugate of a symbol s and −s* can denote an additive inverse conjugate of a symbol s. According to possible embodiments, the signal cancellations when simulcasting the same signal from multiple eNB's can be avoided by using transmit diversity. Two transmit diversity methods are defined in LTE. The first of these is SFBC and the second is SFBC+FSTD. SFBC can be defined for unicast transmission with two antenna ports and SFBC+FSTD can be defined for unicast transmission with four antenna ports. Both of these transmission schemes can have rate one so that there is no rate loss associated with their use. An antenna port can be defined such that the channel over which a symbol on the antenna port is conveyed can be inferred from the channel over which another symbol on the same antenna port is conveyed. An antenna port may in practice be implemented either as a single physical transmit antenna, or as a combination of multiple physical antenna elements, such as by applying a weighting to the signals transmitted over each of the physical antenna elements. To apply weighting and implement an antenna port for N antennas, a weighting vector w can be defined as a complex-valued vector of length N. The input vector to the N antennas can be the product of the signal to be transmitted, which is a complex scalar, and the weighting vector.

Figure 5:
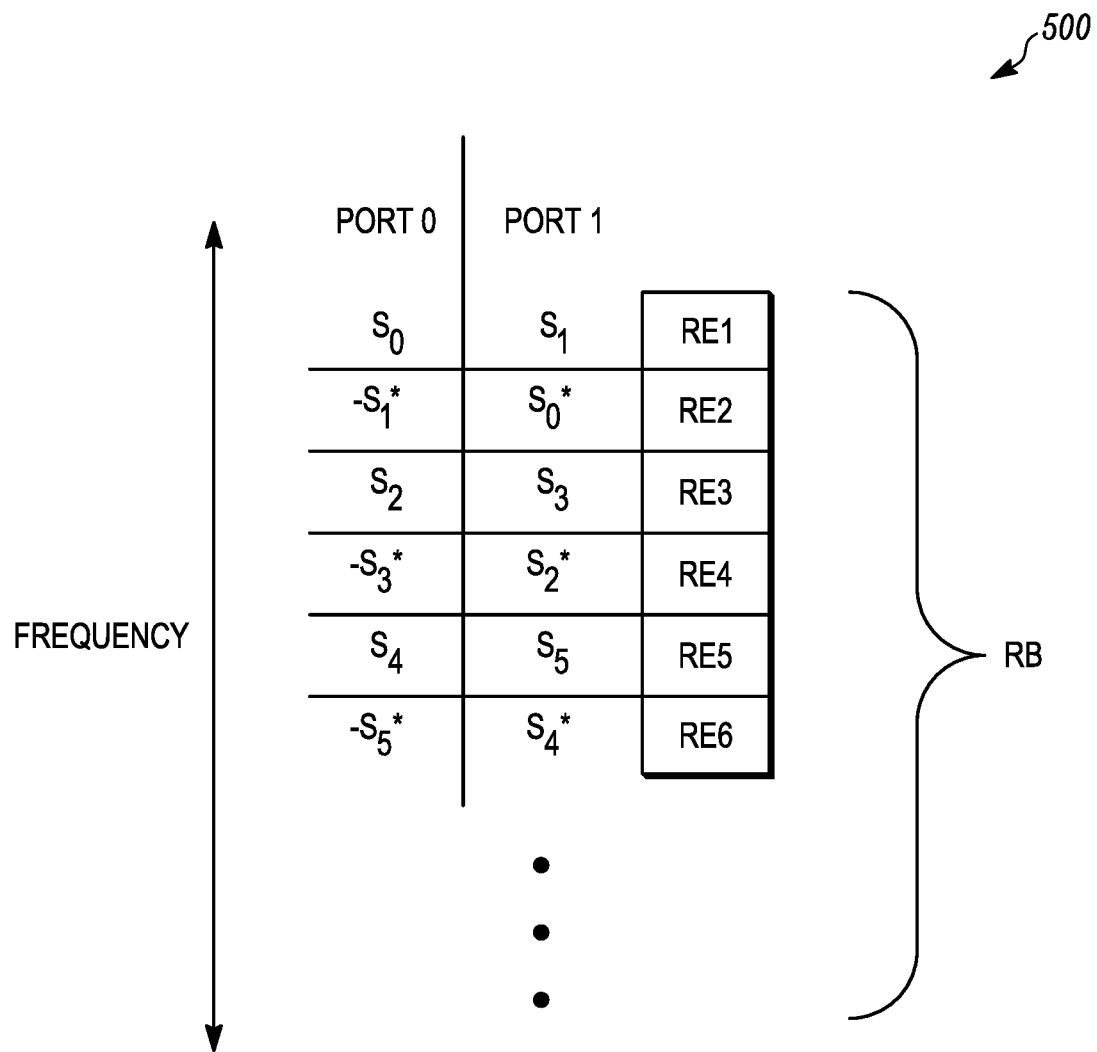
FIG. 5 is another example illustration of SFBC mapping of symbols to antenna ports according to a possible embodiment.

FIG. 5 is another example illustration 500 of SFBC mapping of symbols to antenna ports according to a possible embodiment. Again, s can denote symbols and RE can denote resource elements. Also, s* can denote a conjugate of a symbol s and −s* can denote an additive inverse conjugate of a symbol s. As shown, streams of the symbols s can be in two streams from the antenna ports port 0 and port 1. For example, a first symbol $s_0$ can be transmitted from a first port 0 in a first resource element RE1 and a conjugate of the first symbol $s_0$* can be transmitted from a second port 1 in a second resource element RE2. A second symbol $s_1$ can be transmitted from the second port 1 in the first resource element RE1 and an additive inverse conjugate of the second symbol −$s_1$* can be transmitted from the first antenna port 0 in the second resource element RE2.

Figure 6:
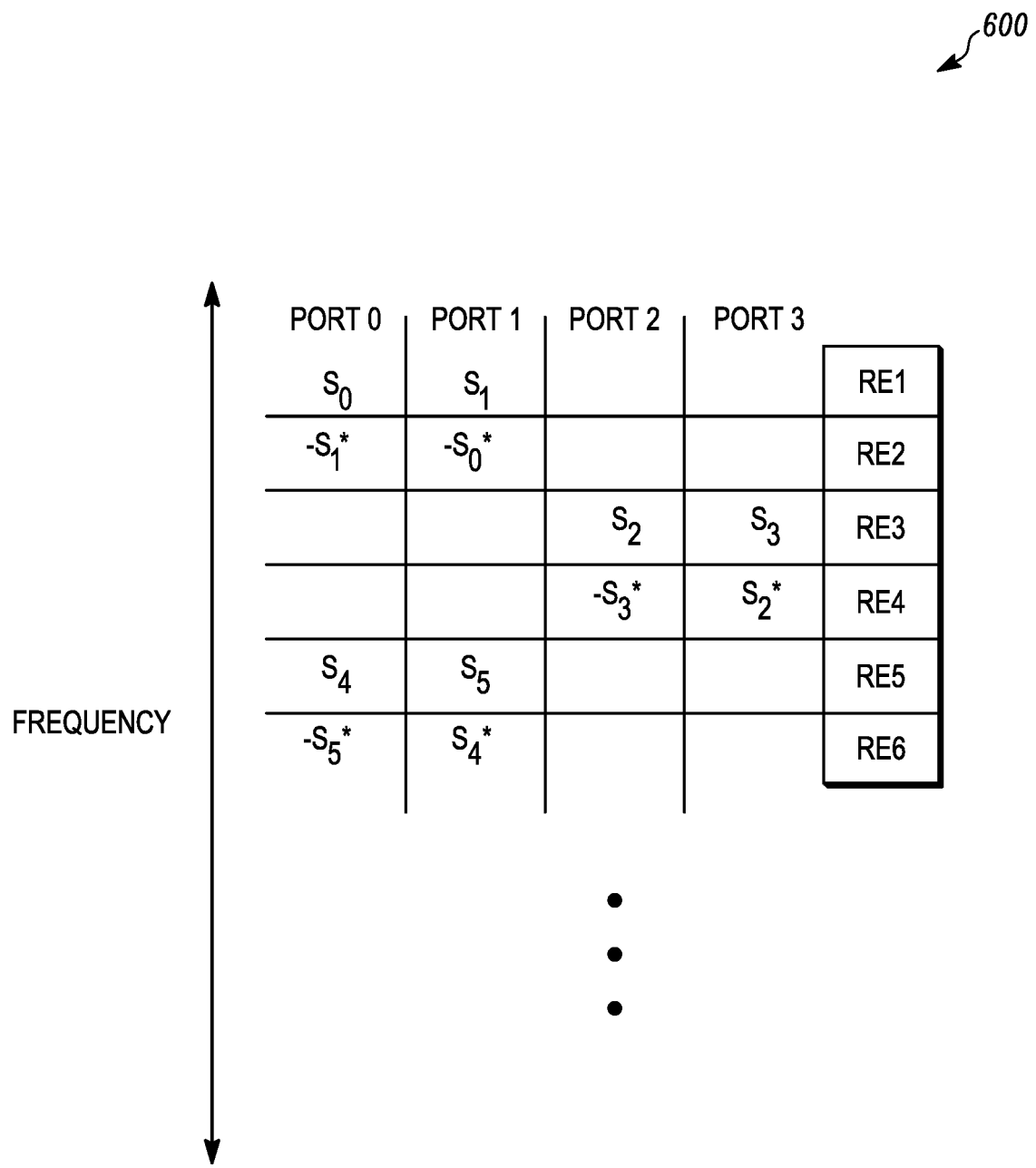
FIG. 6 is another example illustration of SFBC+FSTD mapping of symbols to antenna ports according to a possible embodiment.

FIG. 6 is another example illustration 600 of SFBC+FSTD mapping of symbols to antenna ports according to a possible embodiment for four streams. Again, s can denote symbols and RE can denote resource elements. Also, s* can denote a conjugate of a symbol s and −s* can denote an additive inverse conjugate of a symbol s. In the SFBC aspect, streams of the symbols s can be in two streams from the antenna ports port 0 and port 1. For example, a first symbol $s_0$ can be transmitted from a first port 0 in a first resource element RE1 and a conjugate of the first symbol $s_0$* can be transmitted from a second port 1 in a second resource element RE2. A second symbol $s_1$ can be transmitted from the second port 1 in the first resource element RE1 and an additive inverse conjugate of the second symbol −$s_1$* can be transmitted from the first antenna port 0 in the second resource element RE2.

Furthermore, in the SFBC+FSTD aspect, streams of the symbols s can be in another two streams from the antenna ports port 2 and port 3. For example, a first symbol $s_2$ of the other two streams, which can also be considered a third symbol in all of the streams, can be transmitted from a third port 2 in a third resource element RE3 and a conjugate of the third symbol $s_2$* can be transmitted from a fourth port 3 in a fourth resource element RE4. A second symbol $s_3$ of the other two streams, which can also be considered a fourth symbol in all the streams, can be transmitted from the fourth port 3 in the third resource element RE3 and an additive inverse conjugate of the fourth symbol −$s_3$* can be transmitted from the third antenna port 2 in the fourth resource element RE4. The transmissions of the four streams can continue as shown by symbols $s_4$ and $s_5$ and resource elements RE5 and RE6.

According to possible embodiments, SFBC+FSTD can be used for MBMS transmission. It can be assumed that each eNB transmits from a single port. However, the eNB's can be partitioned into two sets. The eNB's in the first set can be assigned a first port, such as a port 0, transmission. The eNB's in the second set can be assigned a second port, such as a port 1, transmission. The assignment of the eNB's into two sets can be done in a planned manner in order to minimize the probability of outage. Alternatively, the eNB's can be partitioned in a random manner as any partition can reduce the outage probability and improve the reliability of the MBMS transmissions over the coverage region. In a planned scenario, adjacent cells and sectors can be assigned to different sets whenever possible. In a random or pseudo-random scenario, the set assignment may be a function of the global cell Identifier (ID).

Figure 7:
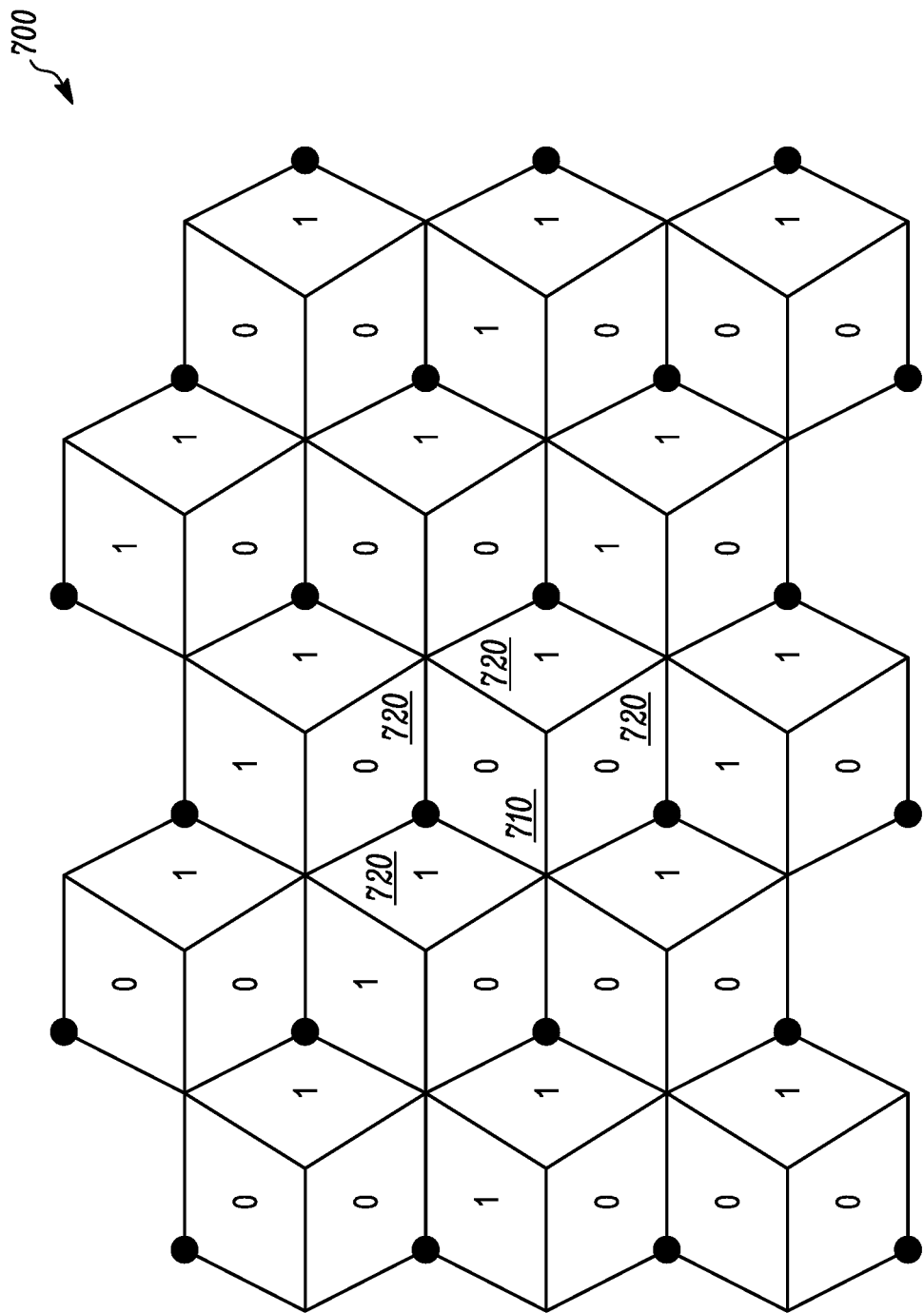
FIG. 7 is an example illustration of port assignment for SFBC transmission of Multimedia Broadcast Multicast Service (MBMS) data according to a possible embodiment.

FIG. 7 is an example illustration 700 of port assignment for SFBC transmission of MBMS data according to a possible embodiment. With only two ports, it may not be possible to assign the ports in a possible implementation such that for a given sector 710, all sectors 720 sharing an edge with that sector 710 can be assigned a different port. In the illustration 700, each sector, such as sector 710, shares an edge with four other sectors, such as sectors 720. Of the four sectors 720 sharing an edge with a given sector 710, in all cases two or three of these sectors 720 can be assigned the other port.

According to a possible implementation of SFBC for MBMS, any partition of the eNB's between port 0 and port 1 can improve the reliability of the eMBMS transmission over the coverage region. According to a related possible implementation, the UE can decode the received signal even if it only receives the transmission from a single eNB or from a group of eNB's assigned the same port, such as port 0. Similarly, the UE can decode the received signal even if it only receives the transmissions from port 1. According to a related possible implementation, the UE may not need to know which eNB's are assigned port 0 and which are assigned port 1 so that no extra signaling may be required for this transmission method. The UE may only need to know that SFBC is used to transmit the MBMS signal.

A first order analysis can be given by the following. For a given UE, let the sum channel from all eNB's transmitting on port 0 be given by h0. Similarly, for the same UE, let the sum channel for all eNB's transmitting on port 1 be given by h1. Both h0 and h1 are in general complex-valued. Without the use of transmit diversity as proposed, the resulting channel is h0+h1. If h0=−h1, then the resulting channel is 0 and the received power is 0. Note that this is true even if the received signal is strong so that $\|h0\|^2=\|h1\|^2$ is large. Conversely, with the use of transmit diversity as proposed, the power of the received signal can be $\|h0\|^2+\|h1\|^2$. Thus, the proposed transmission scheme is more robust than the existing MBMS transmission scheme.

Furthermore, as noted above, the signal can be decoded even if the aggregate channel h0=0, or alternatively, if the aggregate channel h1=0. The receiver performance can be determined entirely by the sum $\|h0\|^2+\|h1\|^2$ and the channel noise variance sigma^2. Thus, as long as the ratio $(\|h0\|^2+\|h1\|^2)/sigma^2$ exceeds a threshold, the transmission can be successfully received.

Figure 8:
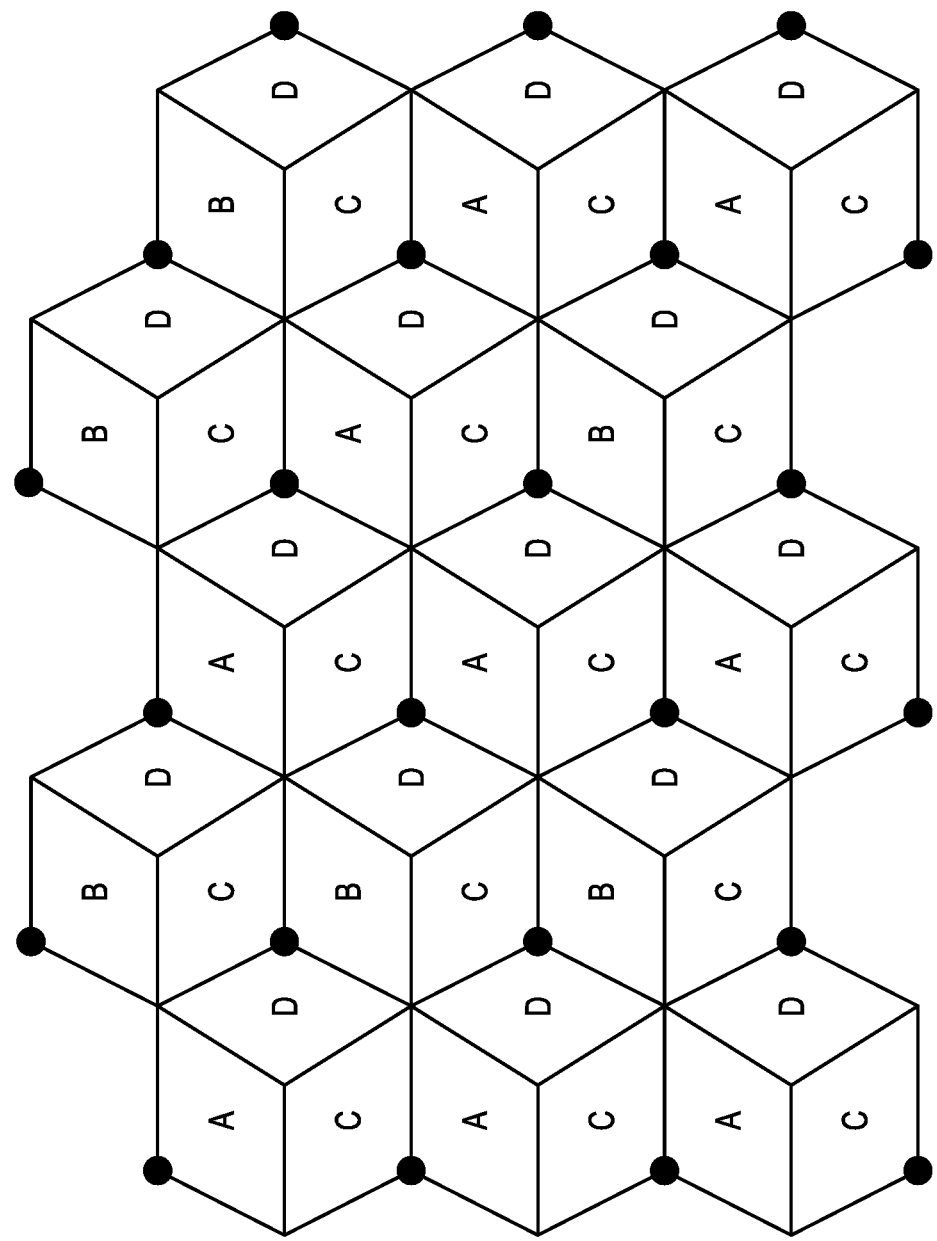
FIG. 8 is an example illustration of port set assignment for SFBC+FSTD transmission of MBMS data according to a possible embodiment.

FIG. 8 is an example illustration 800 of port set assignment for SFBC+FSTD transmission of MBMS data according to a possible embodiment. The illustration 800 can show an example tiling of four sets of sectors A, B, C, and D. According to this embodiment, no two sectors sharing an edge may be assigned the same set. For example, in a similar manner to SFBC, SFBC+FSTD can be used for MBMS transmission. When using SFBC+FSTD for MBMS transmission, each eNB can transmit on two antenna ports. Sectors of the eNB's can be partitioned into four sets labeled A, B, C, and D. Sectors of the eNB's in set A can transmit ports 0 and 2, sectors of the eNBs in set B can transmit ports 0 and 3, sectors of the eNB's in set C can transmit ports 1 and 2, and sectors of the eNB's in set D can transmit ports 1 and 3. The signal assigned to any eNB can be sufficient to demodulate all of the data symbols.

For a given UE, let h0 denote the sum channel for port 0 (the sum channel from the first antennas of eNB's in sets A and B), h1 denote the sum channel for port 1 (the sum channel from the first antennas of eNB's in sets C and D), h2 denote the sum channel for port 2 (the sum channel from the second antennas of eNB's in set A and C), and h3 denote the sum channel for port 3 (the sum channel from the second antennas of eNB's in sets B and D). In the absence of SFBC+FSTD, the sum channel seen by the UE can be given by h0+h1. As before, if h0=−h1, the two channels can annihilate each other so that the sum channel is h0+h1=0. Conversely, when SFBC+FSTD is used, the received signal power for symbols s0 and s1 can be $\|h0\|^2+\|h1\|^2$. Similarly, the received power for symbols s2 and s3 can be $\|h2\|^2+\|h3\|^2$ and the channels h2 and h3 may no longer annihilate. Thus, the SFBC+FSTD transmission may be more robust against outage than using either transmission mode 1 or SFBC.

While the use of SFBC+FSTD for MBMS could be implemented with only two sets A and B, it is also possible to implement with four sets A, B, C, and D. However, if the second antenna of eNB's in set A are both used to transmit port 2, then the set of propagation channels comprising h0 and h1 can be the same. As a result, h0 and h1 can be correlated even if the first and second antennas from each eNB are uncorrelated.

According to a possible implementation of SFBC+FSTD for MBMS, the reliability of the MBMS channel can be improved since signals transmitted from different sets A, B, C, and D may no longer cancel or annihilate one another. Equivalently, in the case of Line of Sight (LOS) transmission, there may be no nulls in the aggregate antenna pattern resulting from the simultaneous transmission from all MBMS eNB's. According to a related implementation, the signal transmitted from any eNB in any of the sets A, B, C, and D can be sufficient to demodulate all data symbols. The UE can decode the received signal even if it only receives the transmission from a single MBMS eNB in any of the sets A, B, C, and D. According to a related possible implementation, the UE may not need to know which eNB's are assigned port 0, port 1, port 2, and port 3 so that that no extra signaling may be required for this transmission method. The UE may only need to know that SFBC+FSTD is used to transmit the MBMS signal.

Figure 9:
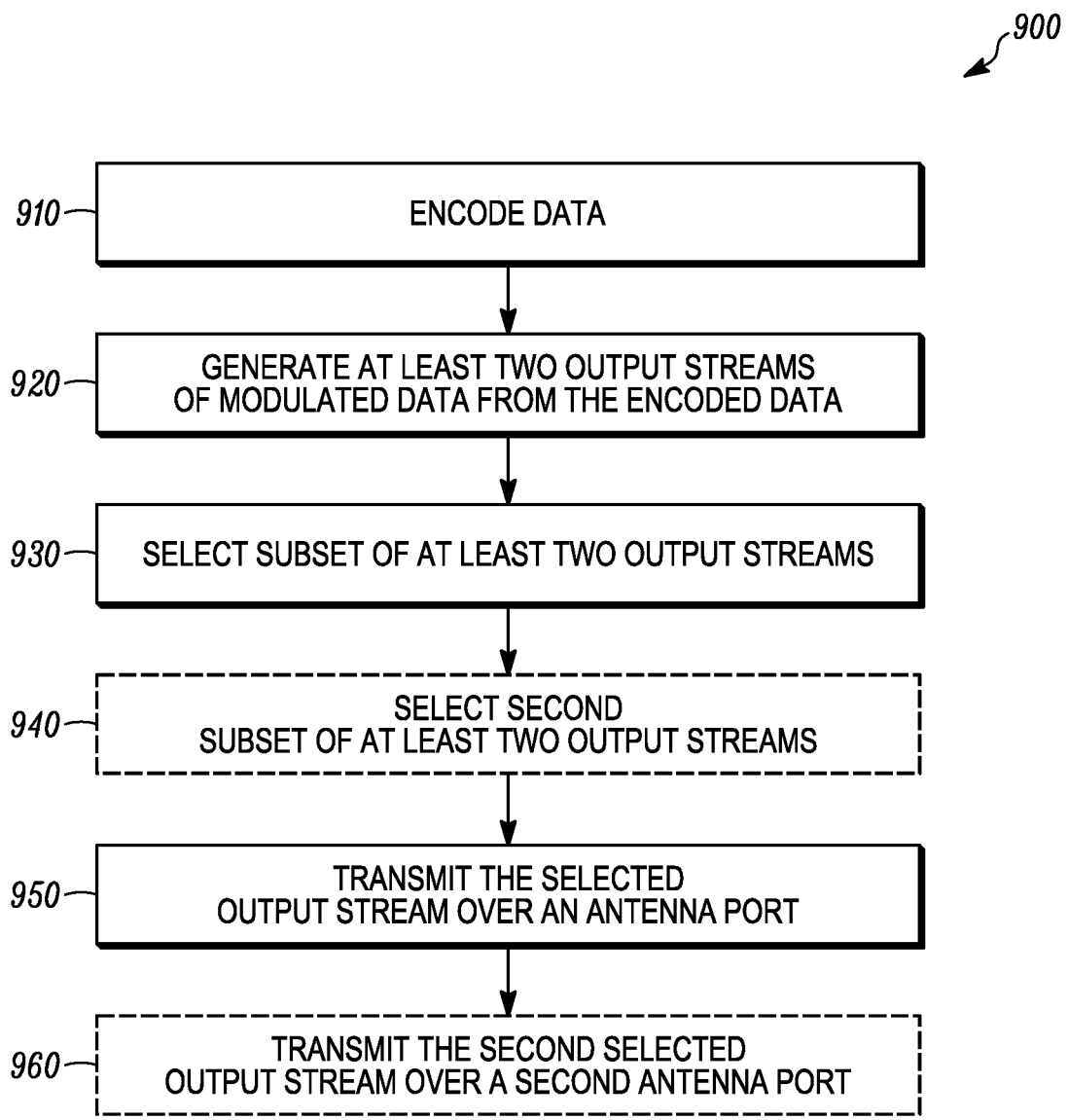
FIG. 9 is an example flowchart illustrating the operation of a base station according to a possible embodiment.

FIG. 9 is an example flowchart 900 illustrating the operation of a base station, such as the base station 120, according to a possible embodiment. The base station can be a multi-sector base station. At 910, data can be encoded to generate encoded data at a transmitter at a base station. The encoded data can be broadcast/multicast, such as Multimedia Broadcast Multicast Services (MBMS), data. The encoding of the data can be done with an error correction code.

At 920, at least two streams of modulated symbols can be generated at the base station from the encoded data. Each of the at least two streams of modulated symbols can correspond to an antenna port of a plurality of antenna ports at the base station. This can apply to both SFBC and SFBC+FSTD, but can be particular to SFBC. The first stream can be $s_0$, $-s_1^*$, $s_2$, $-s_3^*$, etc. The second stream can be $s_1$, $s_0^*$, $s_3$, $s_2^*$, etc.

The at least two streams of modulated symbols can be generated by encoding pairs of data symbols. The pairs of data symbols can be encoded such that a first symbol is transmitted from a first port in a first resource element and a conjugate of the first symbol is transmitted from a second port in a second resource element and a second symbol is transmitted from a second port in the first resource element and an additive inverse conjugate of the second symbol is transmitted from the first antenna port in the second resource element. The encoding of the pairs of data symbols can be with a Space Frequency Block Code (SFBC). For SFBC, the first and second symbols can each be in both of the two streams and they can just appear differently in the two streams. The first and second resource elements may or may not be adjacent in frequency. For example, they may be separated by a resource element with a reference symbol, or the resource elements may be on the same frequency but adjacent in time.

According to a possible embodiment, generating can include encoding two pairs of data symbols such that a first symbol is transmitted from a first port in a first resource element and a conjugate of the first symbol is transmitted from a second port in a second resource element, a second symbol is transmitted from a second port in the first resource element and an additive inverse conjugate is a transmitted from the first antenna port in the second resource element, a third symbol is transmitted from a third port in a third resource element and a conjugate of the third symbol is transmitted from a fourth port in a fourth resource element, and a fourth symbol is transmitted from a fourth port in the third resource element and an additive inverse conjugate is a transmitted from the third antenna port in the fourth resource element.

According to a possible implementation, generating can include space frequency block coding at least two streams of space frequency block coding modulated symbols from the encoded data. Each of the at least two streams of space frequency block coding modulated symbols can correspond to a different antenna port of a plurality of antenna ports at the base station. According to another possible embodiment, four streams of modulated symbols can be generated from the encoded data. Each of the four streams of modulated symbols can correspond to an antenna port of a plurality of antenna ports at the base station.

At 930, a non-empty subset of the at least two streams of the modulated symbols can be selected at the base station. The non-empty subset of the at least two streams of the modulated symbols can be a proper subset of the non-empty subset of the at least two streams of the modulated symbols that includes less than all of the at least two streams of the modulated symbols in the set. If four streams are generated, at least two and less than four of the four streams of the modulated symbols can be selected for transmission.

According to a possible implementation, the streams can be selected such that the encoded data can be uniquely determined from the streams. For example, the selected streams can be uniquely decodable in that the encoded data symbols can be completely determined from the selected streams. As a further example, a first set of two streams generated from the encoded symbols can be transmitted from first and second antenna ports that can be co-located and have the substantially the same coverage. A second set of two streams generated from the encoded data symbols can be transmitted from a third and fourth antenna ports that can be co-located and have the substantially the same coverage. A third set of two streams generated from the encoded symbols different from the first two sets can be transmitted on a fifth and sixth antenna ports that can be co-located and have the substantially the same coverage. A fourth set of two streams generated from the encoded symbols can be transmitted on a seventh and eighth antenna ports that can be co-located and have the substantially the same coverage. Antenna ports can be considered co-located when they correspond to antennas of the same base station. When the first and the third streams are transmitted on a first and second antenna ports and the first and second antenna ports cover the same sector, then the encoded data can be uniquely determined by UE's in the given sector. The encoded data can be uniquely determined in the absence of noise.

According to a possible related embodiment, the selected subset of the at least two streams above can be a selected first subset of the at least two streams of symbols. Then, at 940, a second subset of the at least two streams can be selected.

At 950, the selected subset, such as the selected first subset, of the at least two streams of symbols can be transmitted from the base station over at least one antenna port implemented by applying a weighting to a plurality of antennas. A port can be a virtual antenna port. For example, multiple antennas can weighted and combined to form a single antenna port. Each antenna port of multiple antenna ports can transmit a different reference output stream. Transmitting can include transmitting the selected first subset of the at least two streams of symbols over a first set of antenna ports covering a first sector. A sector can correspond to a contiguous range of azimuth from the base station and different sectors can correspond to different contiguous ranges of azimuth, where the different sectors may overlap but also can be substantially non-overlapping.

At 960, according to a possible related embodiment, the selected second subset of the at least two streams can be transmitted over a second subset of antenna ports covering a second sector different from the first sector. According to a possible implementation, each of a plurality of selected streams can be transmitted over a different antenna port. For example, a first selected output stream of symbols can be transmitted over a first antenna port covering a first sector, a second selected output stream of symbols can be transmitted over a second antenna port covering the first sector, a third selected output stream of symbols can be transmitted over a third antenna port covering a second sector, and a fourth selected output stream of symbols can be transmitted over a fourth antenna port covering the second sector.

According to another possible embodiment, the base station can be a first base station among a plurality of base stations. Each base station can include at least one sector. The sectors of the plurality of base stations can be partitioned into sets. Each set can be allocated at least one stream generated from encoded multimedia broadcast multicast service data to transmit over a number of antenna ports equal to the number of streams. Multimedia broadcast multicast service data can be transmitted simultaneously from multiple base stations using the same set of time/frequency resources. According to a possible implementation, sectors of the base stations can be partitioned into subsets of sectors. Each subset of sectors can be assigned a set of streams. Each sector within a subset of sectors can transmit the streams assigned to the subset of sectors. Each stream can be transmitted over a different port.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 10:
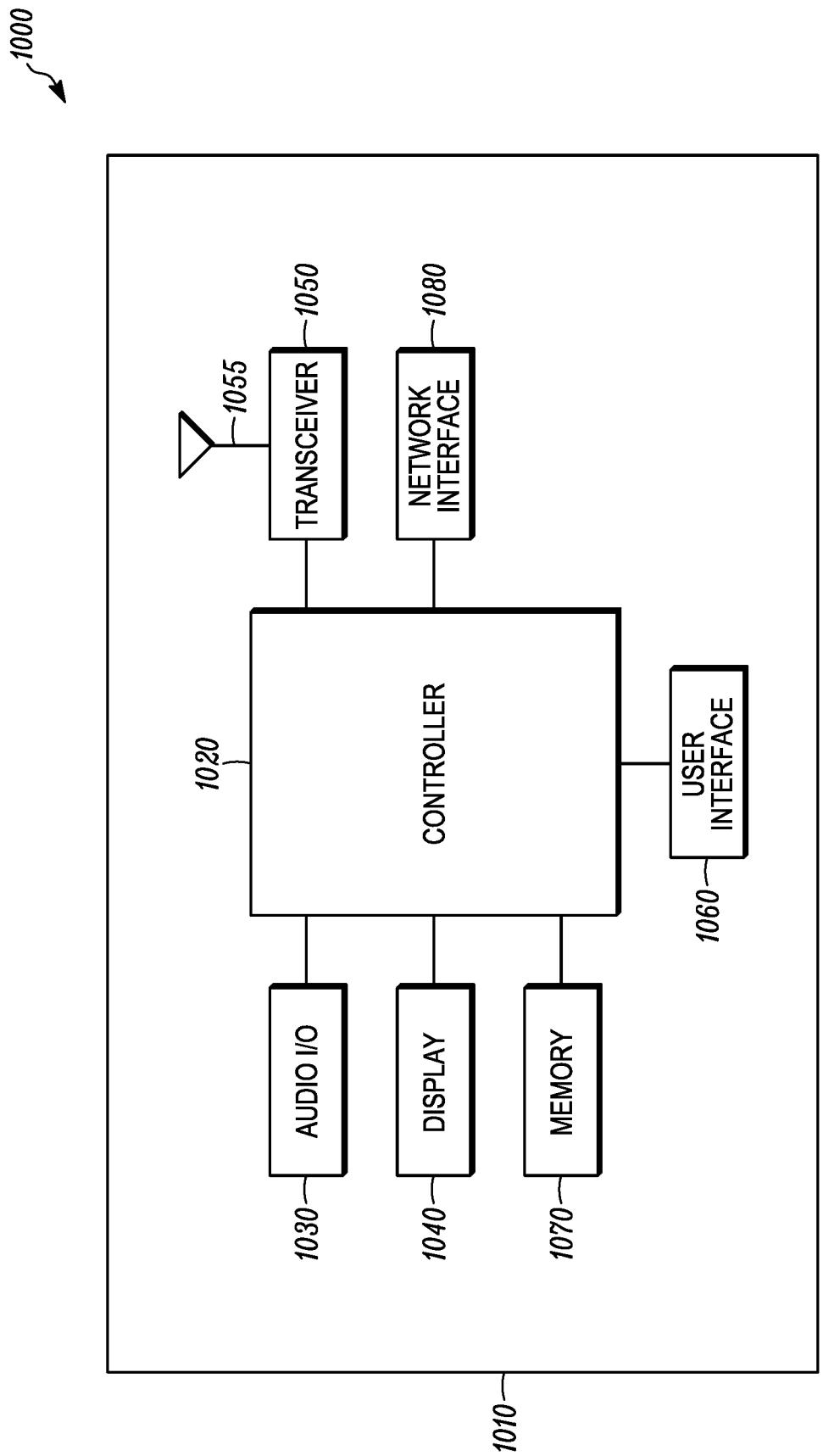
FIG. 10 is an example block diagram of an apparatus according to a possible embodiment.

FIG. 10 is an example block diagram of an apparatus 1000, such as the base station 120, or any other wireless communication device disclosed herein, according to a possible embodiment. The apparatus 1000 can include a housing 1010, a controller 1020 within the housing 1010, audio input and output circuitry 1030 coupled to the controller 1020, a display 1040 coupled to the controller 1020, a transceiver 1050 coupled to the controller 1020, an antenna 1055 coupled to the transceiver 1050, a user interface 1060 coupled to the controller 1020, a memory 1070 coupled to the controller 1020, and a network interface 1080 coupled to the controller 1020. The apparatus 1000 can perform the methods described in all the embodiments.

The display 1040 can be a viewfinder, a liquid crystal display (LCD), a light emitting diode (LED) display, a plasma display, a projection display, a touch screen, or any other device that displays information. The transceiver 1050 can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1070 can include a random access memory, a read only memory, an optical memory, a solid state memory, a flash memory, a removable memory, a hard drive, a cache, or any other memory that can be coupled to an apparatus.

The apparatus 1000 or the controller 1020 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1070 or elsewhere on the apparatus 1000. The apparatus 1000 or the controller 1020 may also use hardware to implement disclosed operations. For example, the controller 1020 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating an apparatus and implementing the disclosed embodiments. Some or all of the additional elements of the apparatus 1000 can also perform some or all of the operations of the disclosed embodiments.

In operation, the controller 1020 can encode data to generate encoded data. The controller 1020 can generate at least two streams of modulated symbols from the encoded data. Each of the at least two streams of modulated symbols can correspond to an antenna port of a plurality of antenna ports at the apparatus 1000. According to a possible implementation, generating can include space frequency block coding at least two streams of space frequency block coding modulated symbols from the encoded data. Each of the at least two streams of space frequency block coding modulated symbols can correspond to a different antenna port of a plurality of antenna ports at the apparatus 1000.

The controller 1020 can select a non-empty subset of the at least two streams of the modulated symbols. According to a possible implementation, the streams can be selected such that the encoded data can be uniquely determined from the streams. The transceiver 1050 can transmit the selected subset of the at least two streams of symbols over an antenna port implemented by applying a weighting to a plurality of antennas.

According to a possible implementation, the controller 1020 can generate at least two streams of modulated symbols by encoding pairs of data symbols such that a first symbol is transmitted from a first port in a first resource element, a conjugate of the first symbol is transmitted from a second port in a second resource element, a second symbol is transmitted from a second port in the first resource element, and an additive inverse conjugate of the second symbol is transmitted from the first antenna port in the second resource element.

According to a possible implementation, the selected subset of the at least two streams can be a selected first subset of the at least two streams. The transceiver 1050 can transmit the selected first subset of the at least two streams of symbols over a first antenna port covering a first sector. The controller 1020 can select a second subset of the at least two streams. The transceiver 1050 can transmit the selected second subset of the at least two streams over a second antenna port covering a second sector different from the first sector.

According to a possible implementation, the controller 1020 can generate at least two streams by generating four streams of modulated symbols from the encoded data. Each of the four streams of modulated symbols can correspond to an antenna port of a plurality of antenna ports at the apparatus 1000. The controller 1020 can select at least two and less than four of the four streams of the modulated symbols for transmission. The transceiver 1050 can transmit each of the selected streams over a different antenna port.

According to another possible implementation, the apparatus 1000 can be a multi-sector base station. The transceiver 1050 can transmit a first selected output stream of symbols over a first antenna port covering a first sector. The transceiver 1050 can transmit a second selected output stream of symbols over a second antenna port covering the first sector. The transceiver 1050 can transmit a third selected output stream of symbols over a third antenna port covering a second sector. The transceiver 1050 can transmit a fourth selected output stream of symbols over a fourth antenna port covering the second sector.

According to another possible implementation, the controller 1020 can generate four streams by encoding two pairs of data symbols such that a first symbol is transmitted from a first port in a first resource element and a conjugate of the first symbol is transmitted from a second port in a second resource element, a second symbol is transmitted from the second port in the first resource element and an additive inverse conjugate is a transmitted from the first antenna port in the second resource element, a third symbol is transmitted from a third port in a third resource element and a conjugate of the third symbol is transmitted from a fourth port in a fourth resource element, and a fourth symbol is transmitted from the fourth port in the third resource element and an additive inverse conjugate is a transmitted from the third antenna port in the fourth resource element.

According to another possible implementation, the data can be encoded multimedia broadcast multicast service data. The apparatus 1000 can be a first base station among a plurality of base stations. Each base station can include at least one sector. The sectors of the plurality of base stations can be partitioned into sets. Each set can be allocated at least one stream generated from the encoded multimedia broadcast multicast service data to transmit over a number of antenna ports equal to the number of streams. In various embodiments, the sectors of the plurality of base stations can be partitioned by a network operator, by a network system, and/or by any other way of partitioning sectors.

According to another possible implementation, the apparatus 1000 can be a first base station among a plurality of base stations. Each base station can include at least one sector. The sectors of the base stations can be partitioned into subsets of sectors. Each subset of sectors can be assigned a set of streams. Each sector within a subset of sectors can transmit the streams assigned to the subset of sectors. Each stream can be transmitted over a different port.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. A method comprising:
   encoding data to generate encoded data at a base station;
   generating, at the base station, at least two streams of modulated symbols from the encoded data;
   selecting, at the base station, a non-empty subset of the at least two streams of the modulated symbols; and
   transmitting, from the base station, the selected subset of the at least two streams of symbols over a number of antenna ports of a plurality of antenna ports at the base station, where the number of antenna ports is equal to a number of streams in the subset of the at least two streams of symbols, where each antenna port of the number of antenna ports is implemented by applying a weighting vector to a plurality of antennas,
   wherein the base station comprises a multi-sector base station,
   wherein the selected subset of the at least two streams comprises a selected first subset of the at least two streams of symbols,
   wherein transmitting comprises transmitting the selected first subset of the at least two streams of symbols over a first set of antenna ports equal in number to a number of streams in the selected first subset covering a first sector, and
   wherein the method further comprises:
     selecting a second subset of the at least two streams; and
     transmitting the selected second subset of the at least two streams over a second set of antenna ports equal in number to a number of streams in the selected second subset covering a second sector different from the first sector.

2. The method according to claim 1, wherein generating comprises encoding pairs of data symbols such that
   a first symbol is transmitted from one antenna port in a first resource element and a conjugate of the first symbol is transmitted from another antenna port in a second resource element, and
   a second symbol is transmitted from the another antenna port in the first resource element and an additive inverse conjugate of the second symbol is transmitted from the one antenna port in the second resource element.

3. The method according to claim 1,
   wherein the at least two streams comprise four streams of modulated symbols from the encoded data, each of the four streams of modulated symbols corresponding to one or more antenna ports of the plurality of antenna ports at the base station.

4. The method according to claim 3, wherein each subset of streams is selected such that the encoded data is uniquely determined from the subset of streams.

5. The method according to claim 3,
   wherein transmitting the selected first subset of streams comprises selecting a first stream of symbols from the selected first subset of streams and transmitting the first selected stream of symbols from the first subset of streams over a first antenna port covering the first sector,
   wherein transmitting the selected second subset of streams comprises selecting a first stream of symbols from the selected second subset of streams and transmitting the first selected stream of symbols from the selected second subset of streams over a second antenna port covering the second sector;
   wherein the method further comprises:
     selecting a second stream of symbols from the first subset of streams and transmitting the selected second stream of symbols from the first subset of streams over a third antenna port covering the first sector; and
     selecting a second stream of symbols from the selected second subset of streams and transmitting the selected second stream of symbols from the selected second subset of streams over a fourth antenna port covering the second sector.

6. The method according to claim 3, wherein generating comprises encoding two pairs of data symbols such that
   a first symbol is transmitted from one antenna port in a first resource element and a conjugate of the first symbol is transmitted from another antenna port in a second resource element,
   a second symbol is transmitted from the another antenna port in the first resource element and an additive inverse conjugate is a transmitted from the one antenna port in the second resource element, a third symbol is transmitted from a second another antenna port in a third resource element and a conjugate of the third symbol is transmitted from a third another antenna port in a fourth resource element, and a fourth symbol is transmitted from the third another antenna port in the third resource element and an additive inverse conjugate is transmitted from the second another antenna port in the fourth resource element.

7. The method according to claim 1, wherein generating comprises space frequency block coding at least two streams of space frequency block coding modulated symbols from the encoded data, each of the at least two streams of space frequency block coding modulated symbols corresponding to a different antenna port of a plurality of antenna ports at the base station.

8. The method according to claim 1,
wherein the encoded data comprises encoded multimedia broadcast multicast service data,
wherein the base station comprises a first base station among a plurality of base stations, each base station including at least one sector, and
wherein the method comprises partitioning the sectors of the plurality of base stations into sets, wherein each set is allocated at least one stream generated from the encoded multimedia broadcast multicast service data to transmit over a number of antenna ports equal to the number of streams.

9. The method according to claim 1,
wherein the base station comprises a first base station among a plurality of base stations, where each base station includes at least one sector,
wherein the method comprises partitioning sectors of the base stations into subsets of sectors,
wherein each subset of sectors is assigned a set of streams,
wherein each sector within a subset of sectors transmits the streams assigned to the subset of sectors, and
wherein each stream is transmitted over a different antenna port.

10. The method according to claim 1, wherein the weighting vector is independent of a channel upon which the selected subset of the at least two streams of symbols is transmitted from the base station to at least one receiver.

11. The method according to claim 1, wherein selecting comprises selecting, at the base station, a non-empty proper subset of the at least two streams of the modulated symbols.

12. An apparatus comprising:
a plurality of antenna ports;
a controller that
encodes data to generate encoded data,
generates at least two streams of modulated symbols from the encoded data, and
selects a non-empty subset of the at least two streams of the modulated symbols; and
a transceiver coupled to the controller, where the transceiver transmits the selected subset of the at least two streams of symbols over a number of antenna ports of the plurality of antenna ports, where the number of antenna ports is equal to a number of streams in the subset of the at least two streams of symbols, where each antenna port of the number of antenna ports is implemented by applying a weighting vector to a plurality of antennas,
wherein the selected subset of the at least two streams comprises a selected first subset of the at least two streams, wherein the transceiver transmits the selected first subset of the at least two streams of symbols over a first set of antenna ports equal in number to a number of streams in the selected first subset covering a first sector,
wherein the controller selects a second subset of the at least two streams, and
wherein the transceiver transmits the selected second subset of the at least two streams over a second set of antenna ports equal in number to a number of streams in the selected second subset covering a second sector different from the first sector.

13. The apparatus according to claim 12, wherein the controller generates at least two streams of modulated symbols by encoding pairs of data symbols such that
a first symbol is transmitted from one antenna port in a first resource element and a conjugate of the first symbol is transmitted from another antenna port in a second resource element, and
a second symbol is transmitted from the another antenna port in the first resource element and an additive inverse conjugate of the second symbol is transmitted from the one antenna port in the second resource element.

14. The apparatus according to claim 12,
wherein the at least two streams comprise four streams of modulated symbols from the encoded data, each of the four streams of modulated symbols corresponding to one or more antenna ports of the plurality of antenna ports at the apparatus.

15. The apparatus according to claim 14, wherein each subset of streams is selected such that the encoded data is uniquely determined from the subset of streams.

16. The apparatus according to claim 14,
wherein the apparatus comprises a multi-sector base station,
wherein the controller selects a first stream of symbols from the selected first subset of streams,
wherein the transceiver transmits the selected first stream of symbols over a first antenna port covering the first sector,
wherein the controller selects a first stream of symbols from the selected second subset of streams,
wherein the transceiver transmits the selected first stream of symbols from the selected second subset of streams over a second antenna port covering the second sector;
wherein the controller selects a second stream of symbols from the first subset of streams,
wherein the transceiver transmits the selected second stream of symbols from the first subset of streams over a third antenna port covering the first sector;
wherein the controller selects a second stream of symbols from the selected second subset of streams, and
wherein the transceiver transmits the selected second stream of symbols from the selected second subset of streams over a fourth antenna port covering the second sector.

17. The apparatus according to claim 14, wherein the controller generates four streams by encoding two pairs of data symbols such that
a first symbol is transmitted from one antenna port in a first resource element and a conjugate of the first symbol is transmitted from another antenna port in a second resource element,
a second symbol is transmitted from the another antenna port in the first resource element and an additive inverse conjugate is a transmitted from the one antenna port in the second resource element, a third symbol is transmitted from a second another antenna port in a third resource element and a conjugate of the third symbol is transmitted from a third another antenna port in a fourth resource element, and a fourth symbol is transmitted from the third another antenna port in the third resource element and an additive inverse conjugate is transmitted from the second another antenna port in the fourth resource element.

18. The apparatus according to claim 12, wherein generating comprises space frequency block coding at least two streams of space frequency block coding modulated symbols from the encoded data, each of the at least two streams of space frequency block coding modulated symbols corresponding to a different antenna port of a plurality of antenna ports at the apparatus.

19. The apparatus according to claim 12,
wherein the encoded data comprises encoded multimedia broadcast multicast service data,
wherein the apparatus comprises a first base station among a plurality of base stations, each base station including at least one sector, and
wherein the sectors of the plurality of base stations are partitioned into sets, where each set is allocated at least one stream generated from the encoded multimedia broadcast multicast service data to transmit over a number of antenna ports equal to the number of streams.

20. The apparatus according to claim 12,
wherein the apparatus comprises a first base station among a plurality of base stations, where each base station includes at least one sector,
wherein the sectors of the base stations are partitioned into subsets of sectors,
wherein each subset of sectors is assigned a set of streams,
wherein each sector within a subset of sectors transmits the streams assigned to the subset of sectors, and
wherein each stream is transmitted over a different port.

* * * * *